US006837532B1

(12) United States Patent
Hicks

(10) Patent No.: US 6,837,532 B1
(45) Date of Patent: Jan. 4, 2005

(54) DUAL SIDE TARP

(76) Inventor: W. Glen Hicks, P.O. Box 914, Minden, LA (US) 71055

(*) Notice: Subject to any disclaimer, the term of this patent is extended or adjusted under 35 U.S.C. 154(b) by 0 days.

(21) Appl. No.: 10/334,048

(22) Filed: Dec. 30, 2002

Related U.S. Application Data

(62) Division of application No. 09/952,488, filed on Sep. 14, 2001, now Pat. No. 6,641,199.

(51) Int. Cl.$^7$ ............................................. B60P 7/02
(52) U.S. Cl. ........................... 296/100.01; 296/136.02; 296/100.17
(58) Field of Search ........................... 296/100.01, 136, 296/98, 105, 100.16, 225, 100.11, 100.14, 104, 136.02, 100.17, 100.15; 135/94; 156/156; 52/2.19

(56) References Cited

U.S. PATENT DOCUMENTS

| | | | | |
|---|---|---|---|---|
| 2,830,606 A | * | 4/1958 | Daugherty | 52/2.19 |
| 3,030,640 A | * | 4/1962 | Gosman | 52/2.19 |
| 3,247,627 A | * | 4/1966 | Bird | 52/2.19 |
| 3,388,509 A | * | 6/1968 | Morra | 52/2.15 |
| 3,779,847 A | * | 12/1973 | Turner | 156/156 |
| 3,892,154 A | | 7/1975 | Duffy | 408/46 |
| 3,970,096 A | * | 7/1976 | Nicolai | 135/94 |
| 4,044,867 A | * | 8/1977 | Fisher | 190/107 |
| 4,093,302 A | * | 6/1978 | Adams | 296/100.16 |
| 4,234,224 A | | 11/1980 | Rosenvold | 296/98 |
| 4,302,043 A | | 11/1981 | Dimmer et al. | 296/98 |
| 4,484,777 A | | 11/1984 | Michel | 296/98 |
| 4,659,134 A | | 4/1987 | Johnson | 296/98 |
| 4,691,957 A | | 9/1987 | Ellingson | 296/100.16 |
| 4,834,445 A | | 5/1989 | Odegaard | 296/98 |
| 4,944,551 A | | 7/1990 | Hardy, Jr. | 296/100.12 |
| 5,002,328 A | | 3/1991 | Michel | 296/98 |
| 5,026,109 A | | 6/1991 | Merlot, Jr. | 160/84.06 |
| 5,050,923 A | | 9/1991 | Petelka | 296/98 |
| 5,180,203 A | | 1/1993 | Goudy | 296/98 |
| 5,242,206 A | * | 9/1993 | Heck | 296/136.02 |
| 5,287,904 A | * | 2/1994 | Smith et al. | 150/166 |
| 5,291,698 A | * | 3/1994 | Rayner, Jr. | 296/100.01 |
| 5,324,090 A | * | 6/1994 | Lehnhoff | 296/136 |
| 5,328,228 A | | 7/1994 | Klassen | 296/98 |
| 5,350,000 A | * | 9/1994 | Wang | 296/136.02 |
| 5,401,074 A | * | 3/1995 | Timerman | 296/136 |
| 5,466,030 A | | 11/1995 | Harris et al. | 296/98 |
| 5,487,584 A | * | 1/1996 | Jespersen | 296/104 |
| 5,516,181 A | * | 5/1996 | Thompson | 296/136 |
| 5,518,289 A | * | 5/1996 | Cobble | 296/136 |
| 5,549,347 A | | 8/1996 | Anderson | 296/98 |
| 5,664,825 A | * | 9/1997 | Henke et al. | 296/136.02 |
| 5,765,901 A | | 6/1998 | Wilkens | 296/98 |
| 5,823,067 A | | 10/1998 | Clarys et al. | 296/98 |
| 5,873,210 A | * | 2/1999 | Brumleve | 296/100.17 |
| 5,890,525 A | * | 4/1999 | Shores | 296/136.02 |
| 5,924,758 A | | 7/1999 | Dimmer et al. | 296/98 |
| 5,938,270 A | * | 8/1999 | Swanson et al. | 296/100.11 |
| 5,941,594 A | * | 8/1999 | O'Neill | 296/136.02 |
| 6,056,347 A | * | 5/2000 | D'Adamo | 296/136.02 |
| RE36,748 E | * | 6/2000 | Stephens et al. | 296/100.17 |
| 6,070,629 A | * | 6/2000 | Whiteside | 296/136.02 |
| 6,135,534 A | | 10/2000 | Schmeichel | 296/98 |
| 6,142,553 A | | 11/2000 | Bodecker | 296/98 |
| 6,206,449 B1 | * | 3/2001 | Searfoss | 296/98 |
| 6,641,199 B1 | * | 11/2003 | Hicks | 296/105 |
| 2002/0021018 A1 | | 2/2002 | Royer | 296/98 |
| 2002/0095861 A1 | * | 7/2002 | Trussell | 47/1.01 R |

OTHER PUBLICATIONS

Page 11 from Shur–Co Catalog.

* cited by examiner

*Primary Examiner*—Kiran Patel
(74) *Attorney, Agent, or Firm*—Thompson & Gustavson, L.L.P.

(57) ABSTRACT

A dual side tarp (10) is disclosed which allows the operator to shift the fixed tube of the tarp from one side of the trailer (12) to the other very quickly and efficiently to allow one side or the other of the trailer to be numbered to facilitate side dumping, for example. Use of pivoting tarp roll stop allows the shifting to be accomplished.

6 Claims, 4 Drawing Sheets

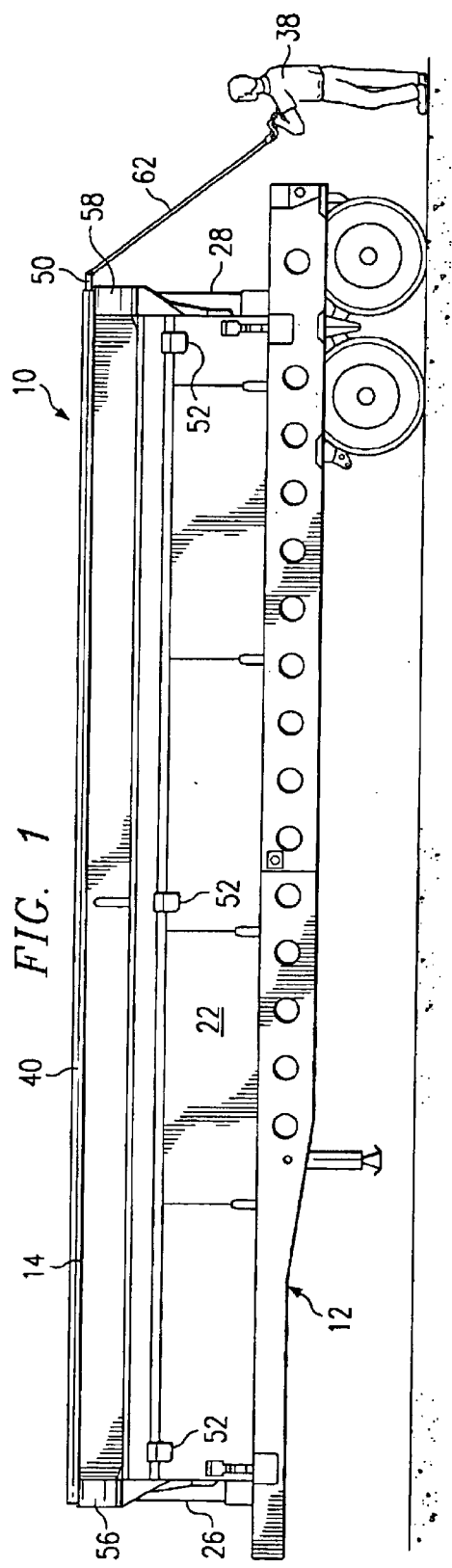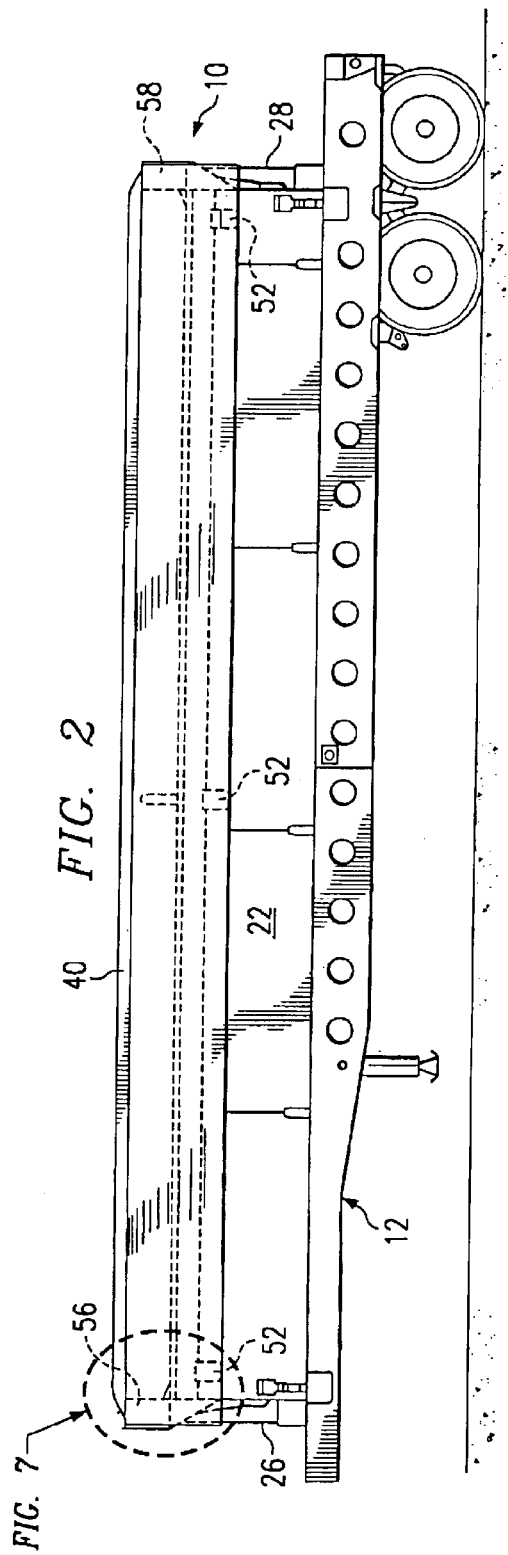

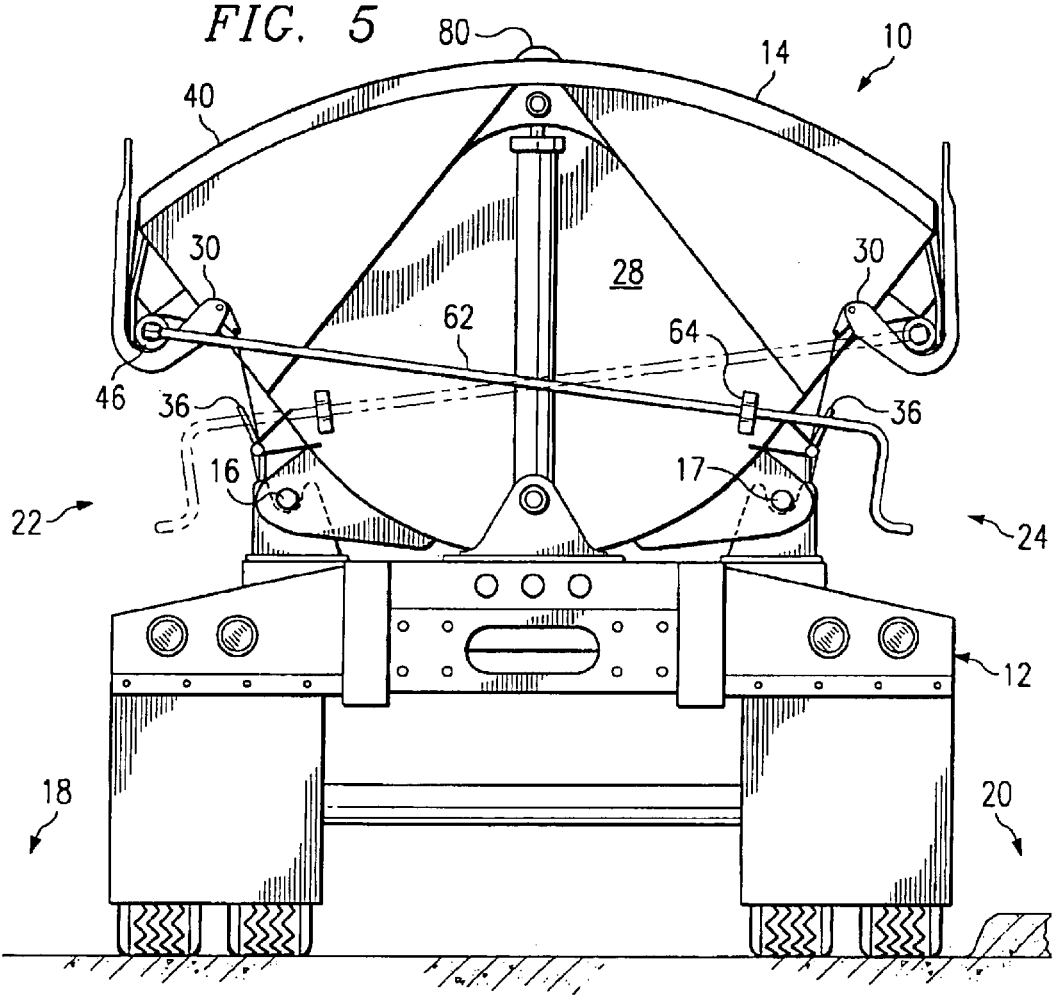
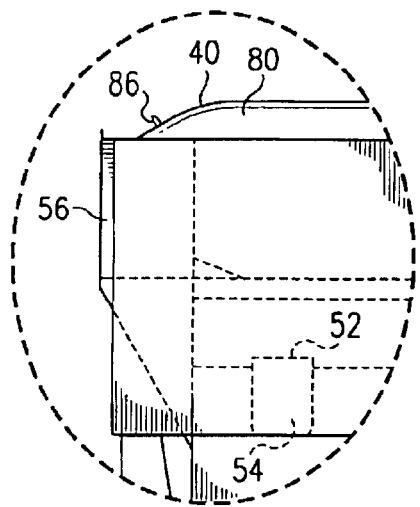
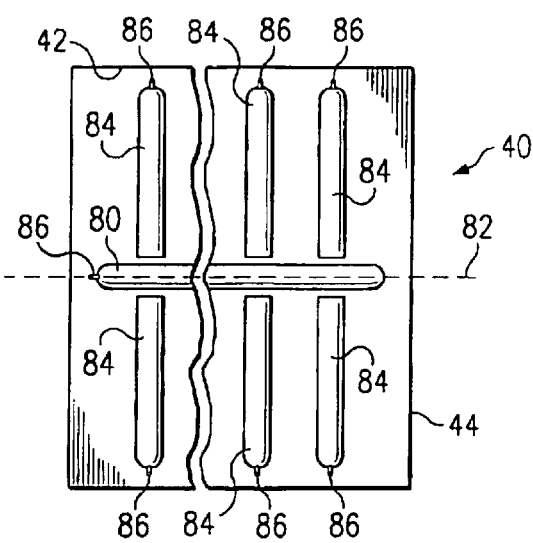

DUAL SIDE TARP

This is a division of U.S. patent application Ser. No. 09/952,488 filed Sep. 14, 2001, now U.S. Pat. No. 6,641,199.

TECHNICAL FIELD

This attention relates to trailers for carrying cargo and particularly to open top containers requiring a covering.

BACKGROUND OF THE INVENTION

Open top trailers are commonly used to carry cargo as diverse as wheat and topsoil. In recent years, many jurisdictions have required the use of a cover or a tarp over the open top of the trailer to prevent cargo from being blown from the trailer onto the highway, possibly endangering other motorists. Furthermore, operators have a financial interest in preventing loss of cargo as well.

A tarp cover has been developed which is commonly used in the industry. The cover includes a tarp with tubes secured at either side. One tube is permanently secured along one side of the trailer near the top. When the top is open for loading and unloading, the tarp is rolled up on the other tube with the movable tube adjacent the fixed tube. When the top is to be covered, the movable tube is rolled over the top of the trailer to the opposite side of the trailer and tightened against a ridge or ledge to secure the tarp over the top of the trailer.

While the conventional tarp cover is effective in many applications, it becomes an inconvenience when using a side dump trailer which can dump in either direction. A need exists to overcome this difficulty.

SUMMARY OF THE INVENTION

In accordance with one aspect of the present invention, an apparatus is provided for a trailer. The trailer has a first side and a second side. The apparatus includes a tarp having a first edge and a second edge with a first tube secured to the tarp at the first edge and a second tube secured to the tarp at the second edge. A first set of tarp roll stops is pivotally mounted to the trailer at the first side thereof, the first set of tarp roll stops pivot between a raised position and a retracted position. A second set of tarp roll stops is pivotally mounted to the trailer at the second side thereof, the second set of tarp roll stops pivotal between a raised position and a retracted position. A first set of tarp keeper strips is mounted to the trailer at the first side and a second set of tarp keeper strips is mounted to the trailer at the second side.

When the tarp is to be opened toward the first side of the trailer, the first set of tarp roll stops is pivoted to the raised position, which secures the first tube to the trailer and permits the second tube to roll between the first side and second side of the trailer to cover and uncover the trailer. When the top is to be opened toward the second side of the trailer, the second set of tarp roll stops is pivoted to the raised position which secures the second tube to the trailer and permits the first tube to roll between the first side and second side of the trailer to cover and uncover the trailer.

In accordance with another aspect of the present invention, a tarp is provided for a trailer. The tarp has a first edge and a second edge. The tarp has an air chamber extending longitudinally parallel the first and second edges which can be inflated to stiffen the tarp.

BRIEF DESCRIPTION OF THE DRAWINGS

A more complete understanding of the invention and its advantages will be apparent from the following Detailed Description, taken in conjunction with the accompanying drawings, in which:

FIG. 1 is a side view of a trailer incorporating a first embodiment of the present invention illustrating a tarp being rolled open by a operator;

FIG. 2 is a side view of the trailer with the tarp in the closed position;

FIG. 5 is an end view of the trailer with the tarp in the closed position;

FIG. 7 is a detail view of the front end of the trailer showing the tarp and air chamber; and FIG. 8 is a plan view of a tarp forming a second embodiment of the present invention utilizing air chambers.

DETAILED DESCRIPTION

Figure 3:
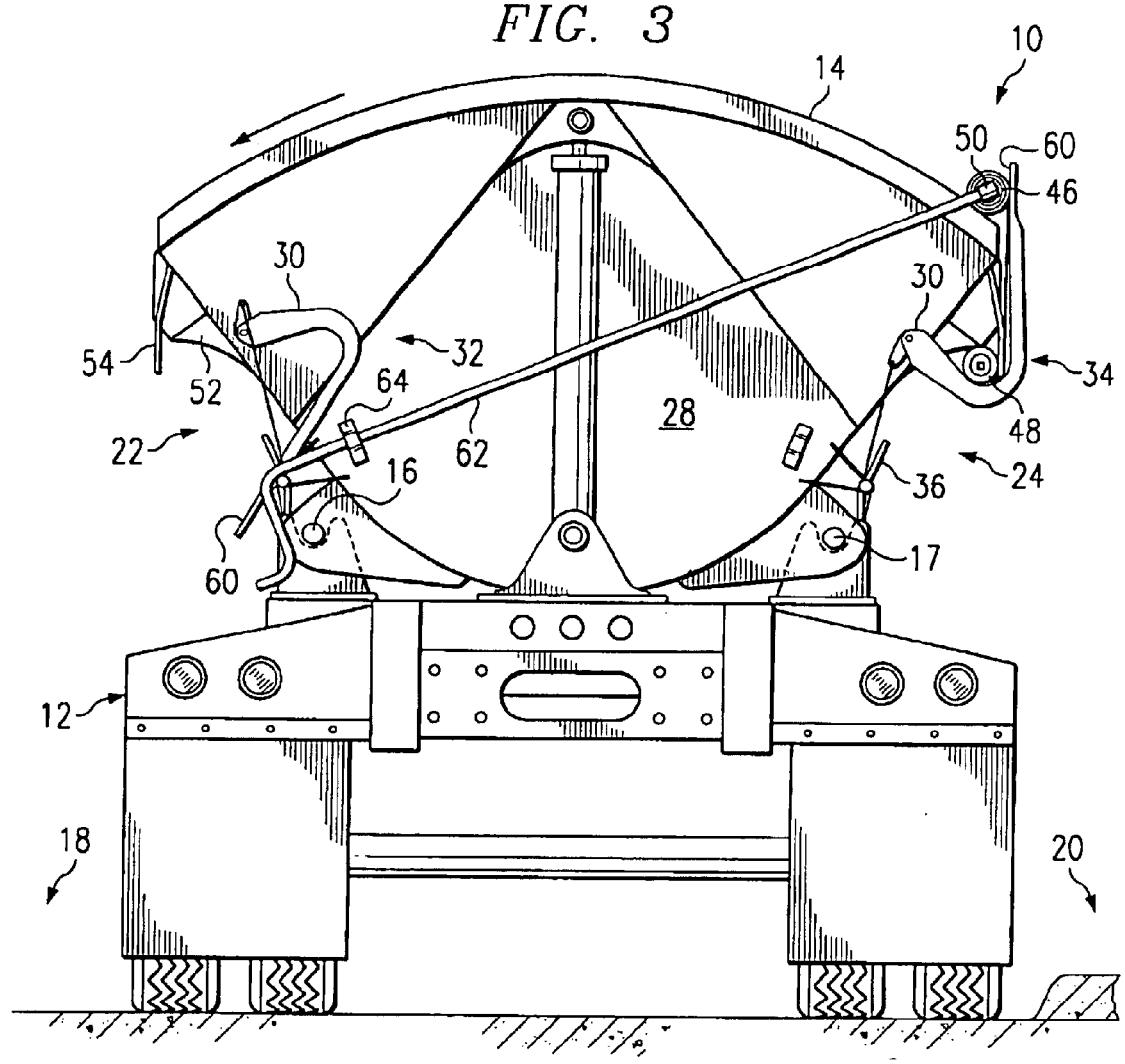
FIG. 3 is an end view of the trailer with the tarp stored for dumping to the roadside.

With reference now to the figures, there is disclosed a dual side tarp 10 forming a first embodiment of the present invention. The dual side tarp is utilized on a trailer 12 having an open top 14. Trailer 12 is a side dump trailer which can be pivoted about axes 16 or 17 in either direction to dump the contents of the trailer to the roadside 18 or to the curbside 20 as desired. Trailer 12 can be used to carry grain, soil, or any other commodity desired. However, the dual side tarp 10 can be used on any trailer which would benefit from the design of the tarp 10.

As will be described in greater detail hereinafter, the dual side tarp 10 permits the fixed portion of the tarp to be readily positioned on either side of the trailer 12, as desired, while permitting the moveable portion of the tarp to be moved over the top 14 of the trailer to cover or uncover the top. This allows the operator to quickly change the side of the trailer unencumbered by the tarp to facilitate dumping on that side and prevent damage to the tarp. The dual side tarp 10 allows the fixed portion of the tarp to be quickly and easily changed from one side of the trailer to the other, allowing great flexibility in the use of the trailer 12.

Figure 4:
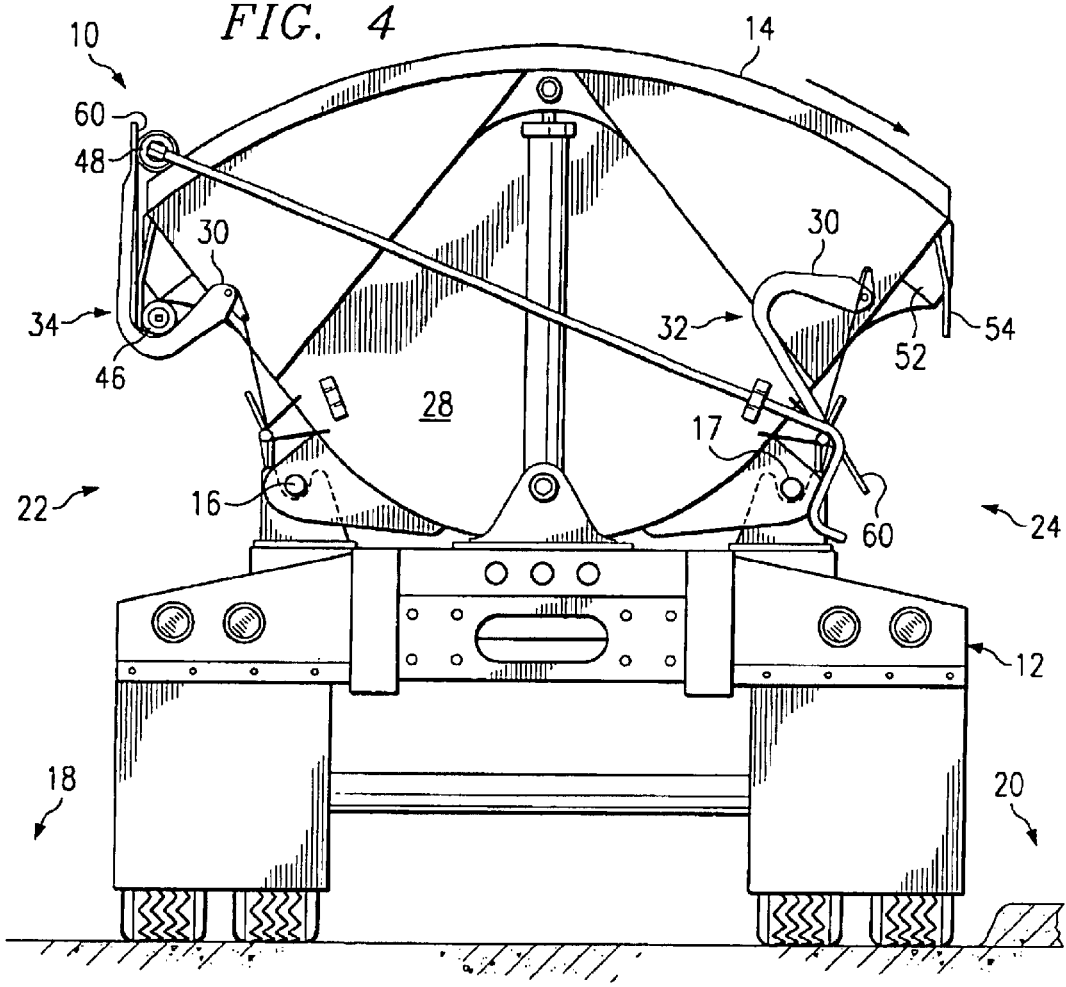
FIG. 4 is an end view of the trailer with the tarp stored for dumping to the curbside.

The trailer 12 defines a first elongate side 22 and a second elongate side 24. The trailer also forms a front end 26 and a rear end 28. Tarp roll stops 30 are pivotally mounted at each end of the trailer on both sides of the trailer. Each tarp roll stop 30 is pivotal for movement between a retracted position 32 and a raised position 34 as shown in FIGS. 3 and 4. Preferably, the tarp roll stops 30 can be pivoted by a tarp roll stop handle 36 activated by the operator 38, but can alternatively be activated by a hydraulic mechanism or electric solenoid mechanism.

A tarp 40 is provided which is formed of conventional tarp materials. The tarp 40 defines a first edge 42 and a second edge 44. The first edge 42 is secured along the length of a first tube 46. The second edge 44 is secured along the length of a second tube 48. At the rear end of each tube 46 and 48 is a receptacle to receive a universal joint 50.

At least two tarp keeper strips 52 are mounted on each side of the trailer 12. The tarp keeper strips 52 have a downwardly extending plate 54. A front shelf 56 is mounted near the front end 26 of the trailer 12 and a rear shelf 58 is mounted near the rear end 28 of the trailer 12.

The operator will decide in which direction the trailer 12 will be tipped, either in the roadside direction 18 or the curbside direction 20. If tipping to the roadside, the tarp roll stops 30 on the second side 24 (the curbside) will be pivoted to the raised position 34, while the tarp roll stops 30 on the first side will be pivoted to the retracted position 32(as seen in FIG. 3). In the raised position, the tarp roll stops 30 will trap second tube 48 between the plates 54 of the tarp keeper strips 52 and the side 24 of the trailer 12 and prevent the second tube 48 from moving. The tarp 40 will extend upwardly from the second tube 48. Meanwhile, the fist tube 46 is free to roll between the first side 22 and second side 24 of the trailer 12 on front and rear shelves 56 and 58 to cover and uncover the top 14 of the trailer 12. When the top is open, the majority of the tarp 40 will be wrapped around the first tube 46. When open, the first tube 46 can be wedged against the stop surfaces 60 of the tarp roll stops 30 on the second side 24 of the trailer 12. The first tube 46 is wedged against the stop surfaces 60 by rotating a removable crank 62 attached to a joint 50 engaging the first tube 46. As is conventionally known, the wedging action can be maintained by pivoting the removable crank about the U-joint 50 parallel the rear end 28 of the trailer 12, as seen in FIGS. 3–5, and securing it in this position with a clamp 64.

Figure 6:
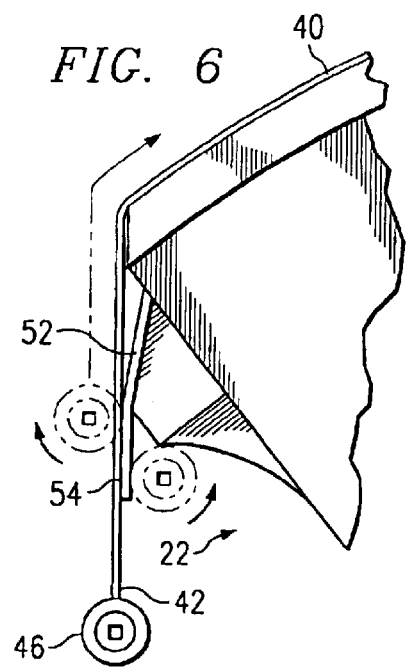
FIG. 6 is a detailed view of the trailer showing the tarp keeper strip.

To cover the trailer 12, the operator would free the removable crank 62 from clamp 64 and rotate the crank 62, rolling the first tube 46 and tarp 40 over the top 14 of the trailer 12. The first tube 46 rotates easily over the front and rear shelves 56 and 58 of the trailer 12. When the first tube 46 is rolled to the fat side 22 of the trailer 12, it is permitted to fall off the first side, as illustrated in FIG. 6, until the tarp 40 is completely unrolled from the first tube 46. The operator continues to roll the tube 46 in the same direction, which causes the tarp 40 to start being rolled up on the first tube 46 in the opposite direction. The first tube 46 is caught by the plates 54 of the tarp keeper strips 52 on the first side 22 and wedged between the plates 54 and the first side 22 by the continued rotation of the tube 46. The operator continues to rotate the tube 46 to achieve a desired tension in the tarp 40 over the top 14 of the trailer 12. When this tension is achieved, the operator then pivots the removable crank 62 about the U-joint 50 to a position parallel the rear end 28 of the trailer 12 and secures the crank 62 to the clamp 64 so that the tarp 40 tightly covers the top of the trailer 12.

When the load in the trailer 12 is to be dumped, the tarp 40 is rolled off the top 14 of the trailer 12 in a reverse operation to that described above. The operator releases the removable crank 62 from clamp 64 and begins to rotate the first tube 46 in the direction opposite the direction used when covering the top 14. As the rotation proceeds, the first tube 46 disengages the plates 54 of the tarp keeper strips 52 and again hangs from the first side 22 until no portion of the tarp 40 is wrapped about the first tube 46. As the rotation continues, the tarp 40 begins to be wrapped about the first tube 46 in the opposite direction. As the tube 46 continues to be rotated, the tube 46 rolls over the front and rear shelves 56 and 58 toward the second side 24 of the trailer 12. Eventually, continued rotation forces the first tube 48 against the stop surfaces 60 of the tarp roll stops 30 on the second side of the trailer 12. The tarp 40 is secured in this open position by again pivoting the removable crank 62 parallel the rear end 28 of the trailer 12 and securing the removable crank 62 in the clamp 64.

If the operator 38 then determines that the next load should be dumped to the curbside, the dual side tarp 10 can be quickly and efficiently reconfigured from the position shown in FIG. 3 to the position shown in FIG. 4. To reconfigured the tarp 10, the tarp roll stops 30 on the second side 24 of the trailer 12 are pivoted from the raised position 34 to the retracted position 32 shown in FIG. 4. This frees the tubes 46 and 48 for movement from the second side 24 to the first side 22. The first tube 46 is rotated as needed to unwrap any tarp 40 still wrapped thereon and is then placed between the plates 54 of the tarp keeper strips 52 and first side 22. The tarp roll stops 30 on the first side 22 are then pivoted from the retracted position 32 to the raised position 34, to secure first tube 46 between the first side 22 and the tarp keeper strips 52. The second tube 48 can then be rolled over the top 14 of the trailer 12 with top 40 to cover and uncover the top of the trailer. When in the open position, the majority of the tarp 40 will be rolled around the second tube 48 which will be tightly urged against the stop surfaces 60 of the tarp roll stops 30 on the first side 22 by rotating the removable crank 62 as previously. In this position, the trailer 12 can be loaded, or tipped to the curbside direction for unloading. To cover the top 14. the removable crank 62 is used to rotate the second tube 48 over the top 14 of the trailer 12 until the second tube 48 falls over the second side 24 to hang with no portion of the tarp 40 wrapped about the second tube 48. As before, continued rotation of the second tube 48 will cause the tarp to begin to be wrapped about the second tube 48 in the opposite direction until the second tube 48 is caught between the plates 54 of the tarp keeper strips 52 on the second side 24 of the trailer 12 to tighten the tarp 40 on the top 14 of the trailer 12.

As can be readily understood, the dual side tarp 10 can be quickly and efficiently reconfigured with the fixed tube 46 or 48 on whichever side is convenient for the direction of dumping. As noted, while the dual side tarp 10 is shown for use on a side dump trailer 12, the dual side tarp 10 can be utilized on any trailer or other device where it could be useful.

With reference to FIGS. 7 and 8, a second embodiment of the present invention will be described. As can be seen, the tarp 40 has an air chamber or tube 80 extending along its longitudinal direction 82 and a series of lateral tubes 84 extending perpendicular to longitudinal direction 82. Longitudinal direction 82 extends parallel the first and second elongate sides 22 and 24. Each of the tubes 80 and 84 have an inflation valve 86 which allows pressurized air to enter the tubes 80 and 84 to inflate the tubes. When inflated, the tarp is stiffened by the inflated tubes 80 and 84. This can allow the tarp to be used without bows over the top 14 of the trailer 12 to support tarp 40, or can be used to supplement the use of bows, as desired. When the tarp 40 is to be rolled on first or second tubes 46 or 48, the inflation valves 86 can be opened to empty the tubes 80 and 84 of air. If desired, the tarp 40 can have only a single tube 80 extending along its longitudinal direction 82, without the use of lateral tubes 84.

While several embodiments of the present invention have been illustrated in the accompanying drawings and described in the foregoing Detailed Description, it will be understood that the invention is not limited to the embodiments disclosed, but is capable of numerous rearrangement, modifications and substitutions of parts and elements without departing from the scope and spirit of the invention.

What is claimed is:

1. A trailer and tarp, comprising:
   a trailer having an open top;
   a tarp covering the open top; the tarp including;
   a flexible material having a predetermined width and a predetermined length, the flexible material having a first edge on a side thereof extending along the predetermined length and a second edge on an opposite side thereof extending along the predetermined length;

a longitudinal airtight chamber defined in said flexible material extending along the predetermined length thereof and generally centered in the width thereof, said longitudinal airtight chamber having a filling device to permit pressurized air to fill the longitudinal airtight chamber to stiffen the tarp to allow the tarp to be self-supporting between the first and second edges thereof.

2. The trailer and tarp of claim 1 wherein the tarp further has at least one transverse airtight chamber defined in said flexible material extending along the predetermined width thereof, said transverse airtight chamber having a filling device to permit pressurized air to fill the transverse airtight chamber to stiffen the tarp.

3. The trailer and tarp of claim 1 wherein the tarp further has a first open top trailer tube, the first edge of the flexible material secured along the first open top trailer tube, and a second open top trailer tube, the second edge of the flexible material secured along the second open top trailer tube.

4. The trailer and tarp of claim 1 wherein the trailer can receive bows to support a tarp covering the open top of the trailer.

5. The trailer and tarp of claim 4 wherein the trailer does not use bows and the tarp supports itself on the trailer.

6. The trailer and tarp of claim 4 wherein the trailer does use bows to assist in supporting the tarp on the trailer.

* * * * *